Patented Jan. 13, 1948

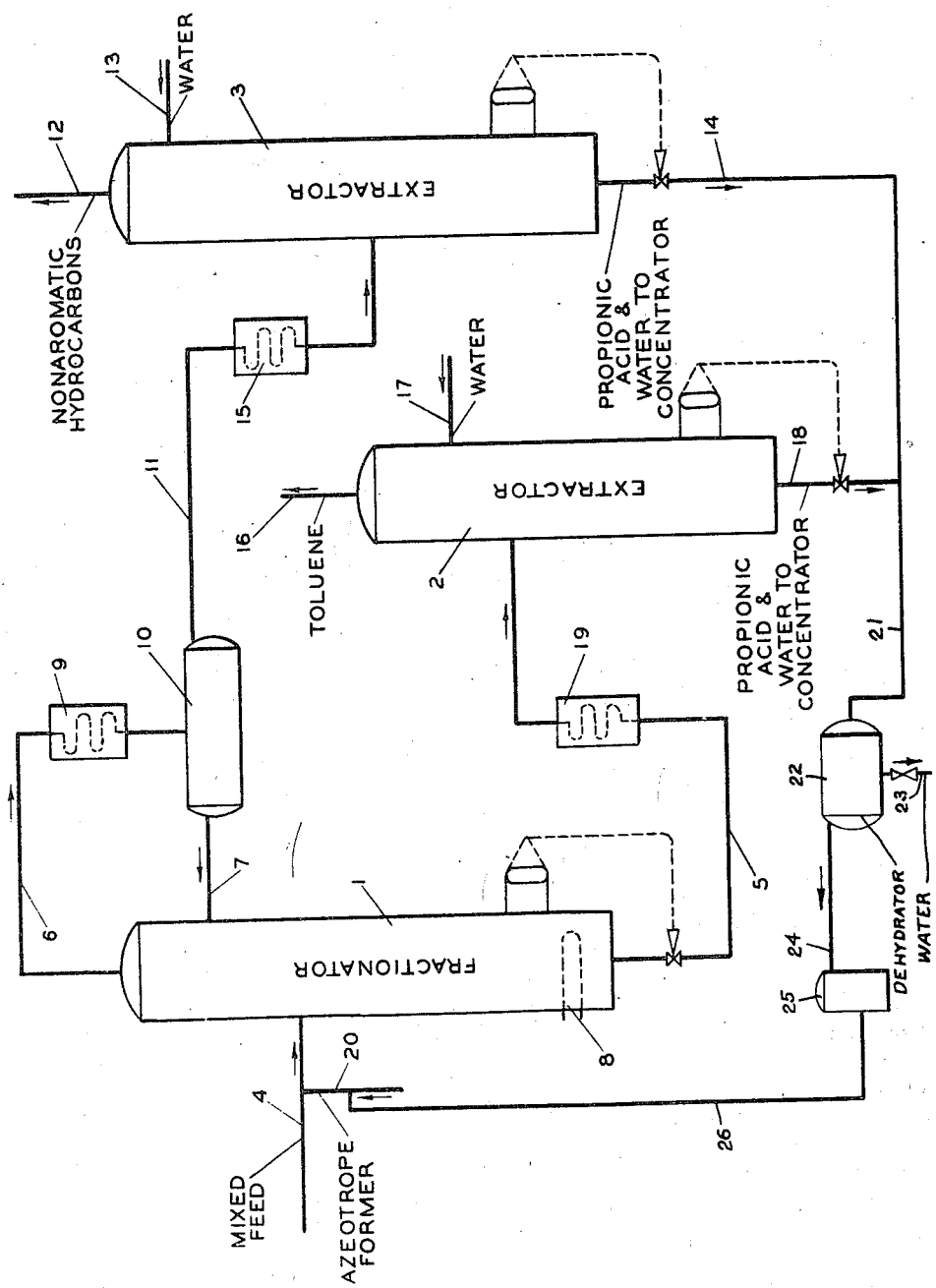

2,434,322

UNITED STATES PATENT OFFICE 2,434,322

AZEOTROPIC DISTILLATION OF TOLUENE WITH PROPIONIC ACID

John W. Latchum, Jr., and James S. Connors, Bartlesville, Okla., assignors to Phillips Petroleum Company, a corporation of Delaware Application November 23, 1943, Serial No. 511,492

1 Claim. (Cl. 202—42)

This invention relates to the separation of hydrocarbons, and more specifically it relates to the separation of a particular hydrocarbon or type or group of hydrocarbons from hydrocarbon mixtures by means of azeotropic distillation.

In the separation of component hydrocarbons of a crude oil naphtha or of a gasoline, a point is reached after which individual hydrocarbons cannot be separated economically by ordinary fractional distillation. In such distillations, as the temperature rises the number of compounds having boiling points within narrow temperature ranges becomes increasingly great, until beginning in the range of the octanes at about 210° F. the separation of individual hydrocarbons requires reflux ratios so high as to increase the cost of the operation to an inordinate degree. As a result, a number of potentially valuable hydrocarbons are lost in the low grade motor fuel stocks.

Other methods for separating individual or groups of hydrocarbons from petroleum mixtures are known in the art. For example, extraction of aromatics or naphthenics with selective solvents, as well as adsorption on silica gel or other adsorbents have been employed. Fractional crystallization may be used. None of these methods, however, approach the economy and practicability of distillation in general for the separation of hydrocarbons. Azeotropic distillation has also been used in special cases.

It is also known to effect the separation of hydrocarbons by means of distillation in the presence of a selective solvent. One example of this latter method involves the use of a polar organic liquid to dissolve selectively naphthenic materials from paraffinic materials in a close cut fraction. The fraction, preferably a 5° F. cut, is fed as a vapor into a column down which is flowing a stream of selective solvent and liquid reflux. The vaporous material to be extracted (naphthenic material) is dissolved by the selective solvent while the paraffinic material remains as vapor and passes overhead. The solvent with its dissolved naphthenic materials passes from the contactor into a fractionator wherein solvent and solute are separate, the solute passing overhead as vapor while the solvent is removed as liquid bottoms for recirculation into the original contactor. One important disadvantage in this process is the need for such close fractionation of the feed stock.

On the other hand, according to our invention a feed cut as wide as 30° F., for example, may be used in our azeotropic distillation and with our particular azeotrope former for the isolation of many hydrocarbons. Such materials as toluene or even aromatic mixtures may be separated from hydrocarbon feed stocks in existing fractionating equipment and without the use of excessively high reflux ratios.

We have found that paraffinic and naphthenic hydrocarbons form azeotropes with a fatty acid. Such azeotropic mixtures possess boiling points below those of the constituent materials and therefore such mixtures pass overhead in a fractionator.

It is an object of this invention to furnish a method for the separation of toluene from mixtures of toluene and nonaromatic hydrocarbons.

Another object of this invention is to provide a method for the separation of toluene from hydrocarbons mixtures containing toluene and nonaromatic hydrocarbon in a form sufficiently pure as to meet product specifications, by the use of conventional fractionating equipment and without the use of excessively high reflux ratios.

Still other objects and advantages will be apparent to those skilled in the art from a careful study of the following disclosure in which The figure represents one form of apparatus, in diagrammatic form, in which the process of our invention may be practiced.

Referring to the figure, numeral 1 refers to a fractionating column, and numerals 2 and 3 to extraction columns. Fractionator 1 is equipped with an inlet line 4, carrying a side line 20, a bottoms outlet line 5, an overhead vapor outlet line 6, a reflux line 7 and a reboiling heater 8, all of which equipment is of conventional design and construction. The vapor outlet line 6 is attached to a condenser 9, which in turn discharges condensate into an accumulator 10. The upper portion of said accumulator is in communication with extraction column 3 by a pipe 11 in which is disposed an exchanger 15. This latter column is fitted with an overhead outlet line 12, a side inlet line 13, and a bottoms outlet line 14. Extraction column 2 is similar in construction to the extractor 3, and is equipped with an overhead outlet line 16, a side inlet line 17 and a bottoms outlet line 18. Fractionator bottoms line 5 carries a cooling coil 19. Lines 18 and 14 connect with a common line 21 for transfer of bottoms from extractors 2 and 3 to a dehydrator 22, of conventional design. The dehydrator 22 is provided with an outlet pipe 23 for withdrawal of water. A line 24 conducts dehydrated propionic acid to a run storage tank 25. From this storage the acid passes through a pipe 26 to pipe 20 and thence into the hydrocarbon feed line 4. Such minor apparatus and equipment, as valves, pressure regulators, temperature measuring devices, etc., are not shown for reasons of simplicity, the use of such members being well understood by those skilled in the art.

The operation of the apparatus for the separation of toluene from a hydrocarbon fraction boiling from about 210° to 240° F., with propionic acid as the azeotrope former, will be explained.

Referring now to the figure, a hydrocarbon feed stock boiling from about 210° to 240° F. and containing toluene enters fractionator 1 from feed line 4. To this feed stock, just previous to its entrance into the fractionator, is added the azeotrope former, which is propionic acid. The propionic acid forms azeotropes with the paraffinic and with the naphthenic hydrocarbons, and the amount of fatty acid added is therefore dependent upon the relative amounts of these said hydrocarbons in the feed stock. While the composition of an azeotropic mixture is constant under a given set of operating conditions, it is well known that the composition varies with pressure, thus the composition of our azeotropes are dependent, at least in part, upon the operating pressure. Under pressures of 10 to 30 pounds per square inch, the paraffinic and naphthenic hydrocarbons boiling from 210° to 240° F. form azeotropes with propionic acid containing approximately 30% propionic acid and about 70% hydrocarbon. The amount of propionic acid added to the feed stock in line 4 is in excess of that amount required to form the said azeotropes, and the excess, since the fatty acid boils at a temperature higher than the boiling range of the hydrocarbon feed stock, will remain in the fractionator bottoms.

Since the herein disclosed fatty acid forms the type of azeotropes with paraffinic and naphthenic hydrocarbons having minimum boiling points, these azeotropes will leave the fractionator as overhead products. Thus the propionic acid-paraffin and propionic acid-naphthene mixtures pass overhead from fractionator 1 through vapor line 6. These vapors are condensed in condenser 9, the condensate accumulates in receiver 10, a portion being returned to the fractionator through line 7 as reflux and the remainder passing by way of line 11, cooled further or heated as required by exchanger 15, into the extractor 3. Since the herein disclosed fatty acid is water soluble, water enters extractor 3 by line 13 to dissolve or extract the said fatty acid from the condensed azeotropes. The thus separated aliphatic hydrocarbons pass from the extractor through line 12 and are conducted to storage, not shown, or otherwise disposed of. The water-propionic acid extract phase leaves the bottom of the extractor, since the mixture is specifically heavier than the hydrocarbons, and passes by way of line 21 to an acid concentrator 22. In this concentrator the wash water is removed from the acid, as for example by distillation, leaving a substantially dry liquid propionic acid which may be transferred through pipe 24 to the intermediate or run storage tank 25 prior to reuse in the original azeotropic separation step (fractionator 1).

The accumulated bottoms in the fractionator 1 are withdrawn through line 5 and pass through cooler 19 into extractor 2 in which water removes any propionic acid retained by the toluene. Water enters the extractor by line 17, toluene leaves by the overhead line 16 while the water-propionic acid mixture leaves by line 18 and is added to the contents of line 21 and passes to the acid concentrator 22, described hereinbefore. From the concentrator, substantially dry propionic acid issues and is passed, preferably to the above mentioned run storage tank 25, previous to reuse in our system. Separate concentrators may be used if conditions warrant, but it will generally be desirable to use only a single concentrator and to pipe the extractor bottoms (water and fatty acid solutions) from extractors 2 and 3 to the single unit for removal of the water from the fatty acid.

The fatty acid concentrator, mentioned above, may be a distillation unit or other means whereby the fatty acid is regenerated in a substantially water free condition, in which condition it is suitable for reuse.

The heating coil 8 in the reboiler section of the fractionating column may be operated in such a manner as will give proper separation between the aromatic or other bottoms and the lower boiling azeotropic material, as for example, the paraffin- and naphthene-propionic acid azeotropes.

The following table shows the physical characteristics of our proposed azeotrope forming substance, together with suggested boiling ranges of hydrocarbon cuts or fractions, the aromatics to be recovered, and the wash agents to be used in recovering the azeotrope former.

| Azeotrope Former (Acid) | Mol Wt. | Ordinary Form | Sp. Gr. | B. P., °F. | Wash Agent | Aromatic to be Recovered | Suggested Hydrocarbon Cut to Use with Azeotrope Former |
|---|---|---|---|---|---|---|---|
| Propionic | 74 | Col. liq. | .992 | 284 | Water | Toluene | °F. 210 to 240. |

It is evident that the proposed substance listed in the above table has the characteristics of a good azeotrope former, such as: (A), boiling point near the boiling points of the hydrocarbons to be separated. (B), it permits the use of inexpensive and efficient washing (extraction from the hydrocarbons) agents, the latter being relatively insoluble in the hydrocarbons. (C), it is reasonably soluble in the hydrocarbons at ordinary temperatures. (D), it is nonreactive toward hydrocarbons whose treatment is herein described. (E), it is substantially noncorrosive to ordinary materials of construction used in fractionating and auxiliary equipment.

We have found that the herein disclosed fatty acid forms the type of azeotropes with hydrocarbons which possesses the minimum boiling points. It has also been found that paraffinic, naphthenic and aromatic hydrocarbons form azeotropes with the disclosed fatty acid, but the minimum boiling mixtures of these types of hydrocarbons with the fatty acid possesses different boiling points, the paraffin-azeotropes having the lowest boiling points, the naphthene-azeotropes having the next lowest boiling points and the aromatic-azeotropes the highest. In other words, paraffinic hydrocarbons have their boiling points lowered most, naphthenic next and aromatics least by use of our azeotrope formers. Thus paraffinics or paraffinics and naphthenics may be taken overhead while the naphthenics and aromatics or aromatics alone are the kettle product, depending upon the separation desired. This spreading effect on the respective boiling points then makes it possible to effect the desired separation with a less efficient column and lower reflux ratios, or to attain better separation with existing columns and the usual reflux ratios. The feed should be substantially free from hydrocarbons boiling higher than the aromatic whose separation is desired, though the presence of some hydrocarbons having slightly higher boiling points may be tolerated.

As an illustration of the advantage offered by our invention, the following example is given: A 210°–240° F. fraction representing approximately 15% of a depentanized natural gasoline, contained 53% paraffins, 42.5% naphthenes (mostly methyl cyclohexane), and 4.5% toluene. Upon redistillation of this stock in a 70-plate column, using a 20:1 reflux ratio and separating the material into three 10° cuts, namely, 210°–220° F., 220°–230° F., and 230°–240° F., but without the use of our azeotrope former, essentially no concentration of toluene (B. P. 231.8° F.) occurred. When this same feed stock was distilled using our propionic acid azeotrope former in the above mentioned 70-plate fractionator and using the same 20:1 reflux ratio, the paraffins and naphthenes were distilled overhead until the kettle product contained 70–80% toluene.

In some cases the hydrocarbon desired to be isolated may form with the fatty acid such a low boiling azeotrope as to be the overhead product of the fractionator in an exceptionally pure condition, in contrast to the above explained operation. Thus, a paraffinic material may be separated from a naphthenic and/or aromatic stock as an overhead azeotrope with the herein disclosed azeotrope former. Similarly, a naphthenic hydrocarbon may be separated from aromatics.

The use of the herein disclosed fatty acid is not intended to be limited to the separation of toluene from hydrocarbons mixtures of approximately equivalent boiling points, but may be used for the separation of naphthenes from paraffins, aromatics from aromatics of different degrees of aromaticity, naphthenes from naphthenes with different numbers of rings, mono- and di-olefins from aromatics and others. This process applies to natural gasoline fractions, or those from crude oil or cracked or reformed distillates, or to hydrocarbon mixtures having received other treatments. Thus it will be seen that the applicability of our process is wide and that it is especially useful in the isolation and concentration of many hydrocarbons.

It will be realized by those skilled in the art that many variations and modifications of our process and apparatus may be made and yet remain within the intended spirit and scope of our invention.

What we claim is:

A continuous process for the separation of toluene from a hydrocarbon fraction of boiling range up to approximately 30° F. and containing toluene and non-aromatic hydrocarbons comprising continuously distilling said hydrocarbon fraction in the presence of propionic acid wherein the non-aromatic hydrocarbons distil overhead with a portion of said propionic acid as minimum constant boiling mixtures and the toluene containing the remainder of the propionic acid becomes concentrated in the still bottoms; extracting said propionic acid with water from said overhead constant boiling mixtures leaving a nonaromatic hydrocarbon portion and an aqueous propionic acid extract; extracting the propionic acid with water from said still bottoms leaving toluene and an aqueous propionic acid extract; combining said aqueous propionic acid extracts and substantially dehydrating same and recycling this substantially dried propionic acid into said continuous distillation step, and withdrawing the toluene and nonaromatic hydrocarbon portions as separate products.

JOHN W. LATCHUM, Jr.
JAMES S. CONNORS.

REFERENCES CITED

The following references are of record in the file of this patent:

UNITED STATES PATENTS

| Number | Name | Date |
|---|---|---|
| 2,290,636 | Deanesly | July 21, 1942 |
| 2,360,655 | Deanesly | Oct. 17, 1944 |
| 2,162,963 | McKittrick | June 20, 1939 |
| 2,358,129 | Lake | Sept. 12, 1944 |
| 2,279,780 | Engel | Apr. 14, 1942 |
| 2,380,019 | Bloomer | July 10, 1945 |
| 2,398,689 | Bloomer | Apr. 16, 1946 |

OTHER REFERENCES

Bureau of Standards Journal of Research; vol. 18, pages 129–134 (Feb. 1937); vol. 21, pages 167–176, 183, 184 (Aug. 1938); vol. 27, pages 39, 40, 44–57, 60–63.

Rossini et al. Proceedings, American Petroleum Institute, sec. III, Refining, Chicago, Ill., Nov. 11–15, 1940, pages 43–47. (Copy in Div. 25.) 202–42–H.

Keyes, Industrial and Engineering Chemistry, vol. 33, pages 1019–1421 (Aug. 1941). (Copy in Sci. Library.) 202–42–H.